No. 838,641. PATENTED DEC. 18, 1906.
A. G. PAUL.
HEATING SYSTEM.
APPLICATION FILED MAY 15, 1900. RENEWED MAY 22, 1906.

3 SHEETS—SHEET 1.

WITNESSES:
Timothy E. Raftery
John O. Gemper

INVENTOR
Andrew G. Paul,
BY
Kenyon & Kenyon
ATTORNEYS.

No. 838,641. PATENTED DEC. 18, 1906.
A. G. PAUL.
HEATING SYSTEM.
APPLICATION FILED MAY 15, 1900. RENEWED MAY 22, 1906.

3 SHEETS—SHEET 2.

WITNESSES:

INVENTOR
Andrew G. Paul
BY
Kenyon & Kenyon
ATTORNEYS.

No. 838,641. PATENTED DEC. 18, 1906.
A. G. PAUL.
HEATING SYSTEM.
APPLICATION FILED MAY 15, 1900. RENEWED MAY 22, 1906.
3 SHEETS—SHEET 3.
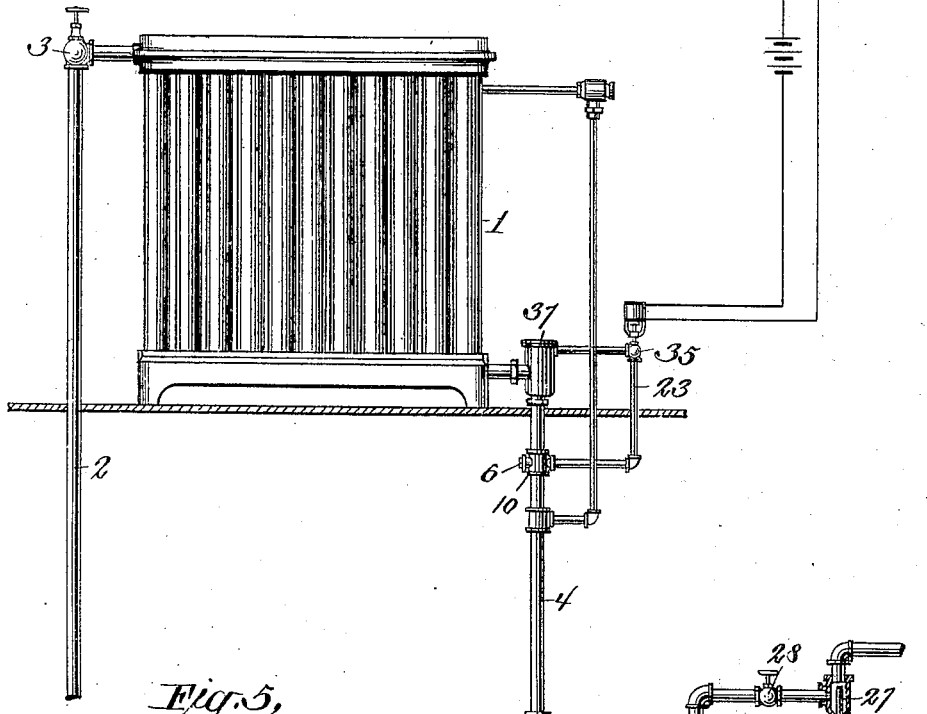
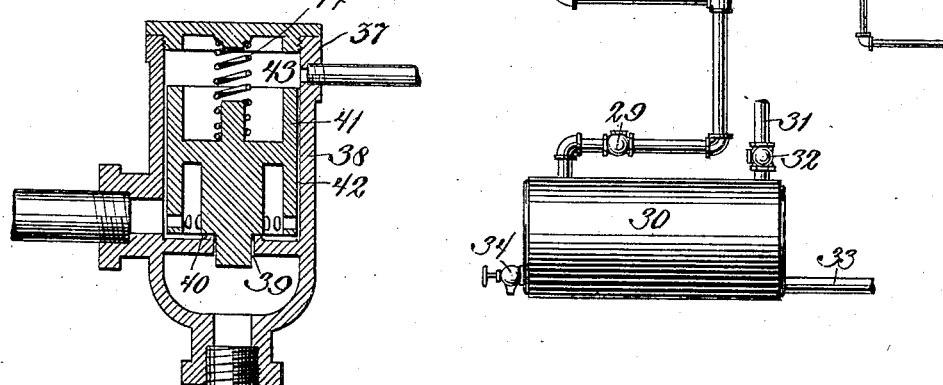
WITNESSES:
INVENTOR
Andrew G. Paul
BY
Kenyon & Kenyon
ATTORNEYS.

UNITED STATES PATENT OFFICE.

ANDREW G. PAUL, OF BOSTON, MASSACHUSETTS, ASSIGNOR TO PAKIN COMPANY, A CORPORATION OF NEW YORK.

HEATING SYSTEM.

No. 838,641.           Specification of Letters Patent.           Patented Dec. 18, 1906.

Application filed May 15, 1900. Renewed May 22, 1906. Serial No. 318,226.

*To all whom it may concern:*

Be it known that I, ANDREW G. PAUL, a citizen of the United States, residing in Boston, in the county of Suffolk and State of Massachusetts, have invented a new and useful Improvement in Heating Systems, of which the following is a full, clear, and exact specification, reference being had to the accompanying drawings, which form a part hereof.

This invention relates to a heating system wherein steam or other suitable heating agent is circulated for the purpose of conveying and imparting heat to the places desired; and it consists in an improved construction and arrangement of the parts of such a system.

The object of my invention is to control the discharge of the air and the water of condensation from the radiator and in addition to this to prevent the loss or waste of the heating vehicle through the discharge-pipe.

My invention consists in the combination, with a heating system, of a supply-pipe, a discharge-pipe, a valve in the discharge-pipe, a motor controlling said valve, a fluid-pressure chamber on one side of said motor, a vent for said chamber, a fluid-pressure device, a pipe connecting the fluid-pressure device and the fluid-pressure chamber, and a thermostat adapted to be operated by the temperature in the discharge-pipe and to control the pipe connecting the fluid-pressure device with the fluid-pressure chamber.

When my complete invention is employed, I combine with the above parts a second thermostat adapted to be placed in the room or apartment to be heated and to control the said connecting-pipe between the fluid-pressure device and the fluid-pressure chamber.

My invention also consists in certain other features of construction and combinations of parts hereinafter described and claimed.

My invention is fully illustrated in the accompanying drawings, in which—

Figure 1:
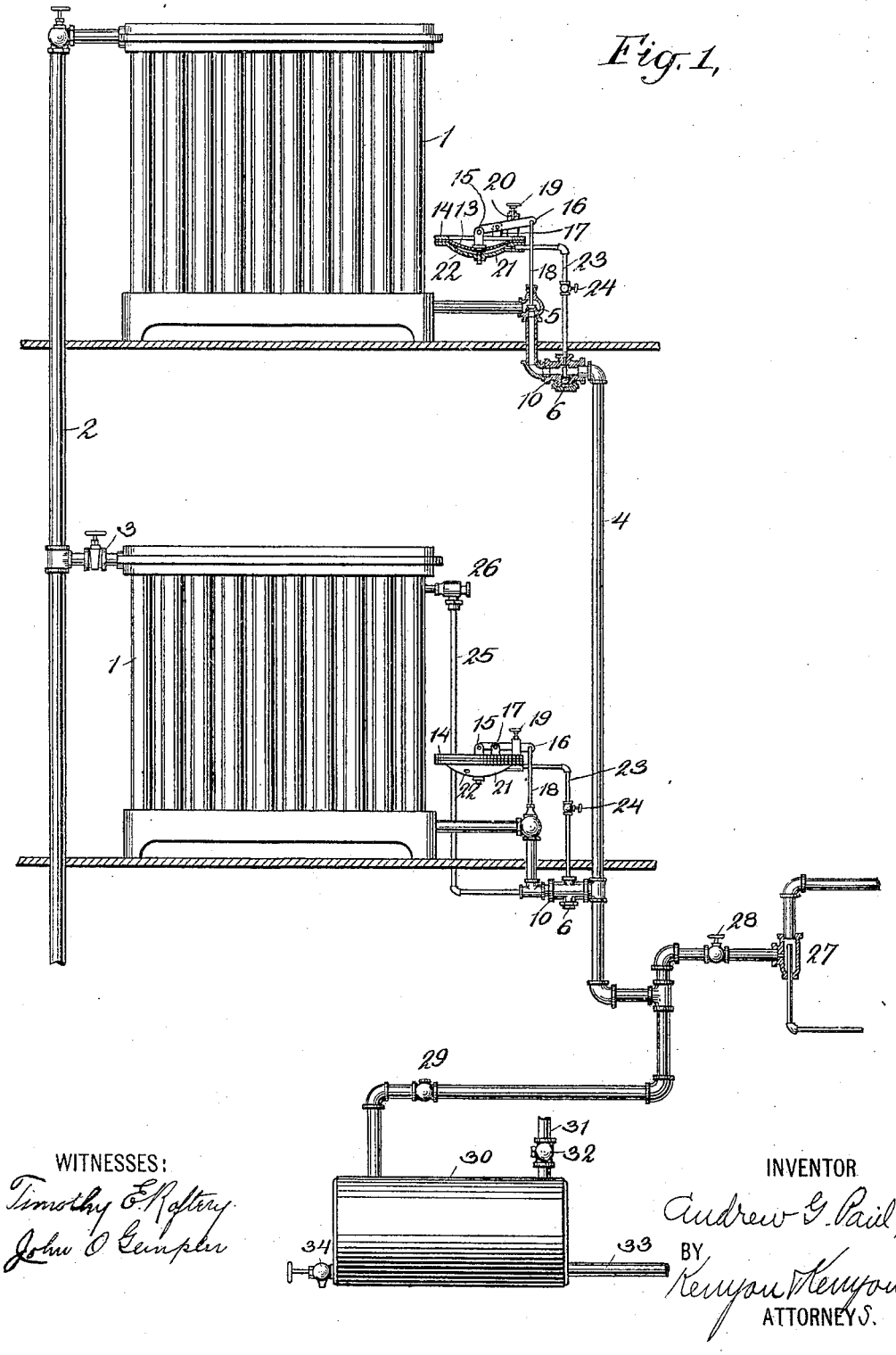
Figure 2:
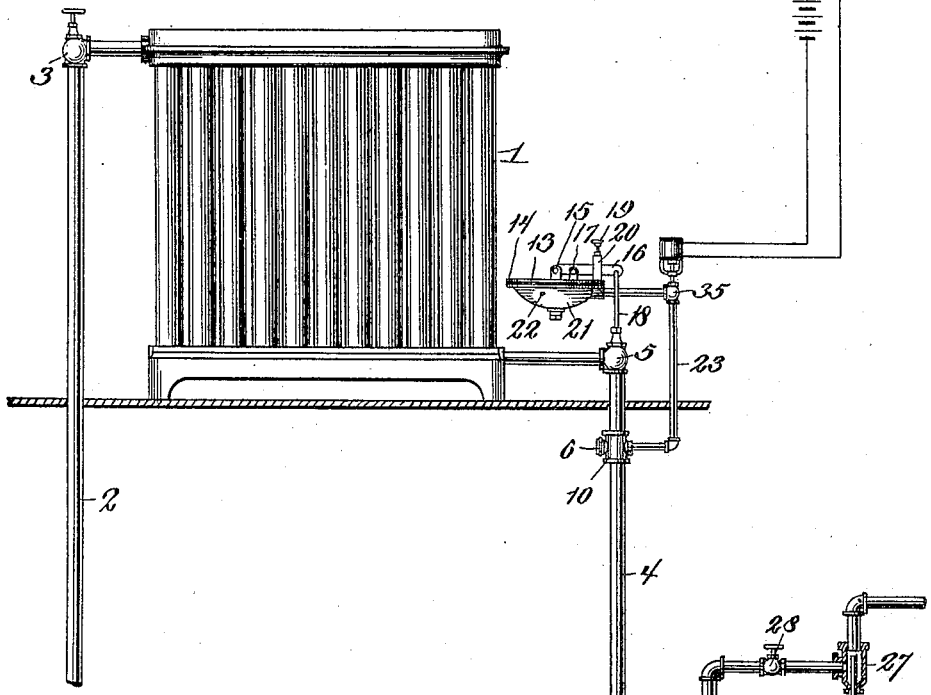
Figure 3:
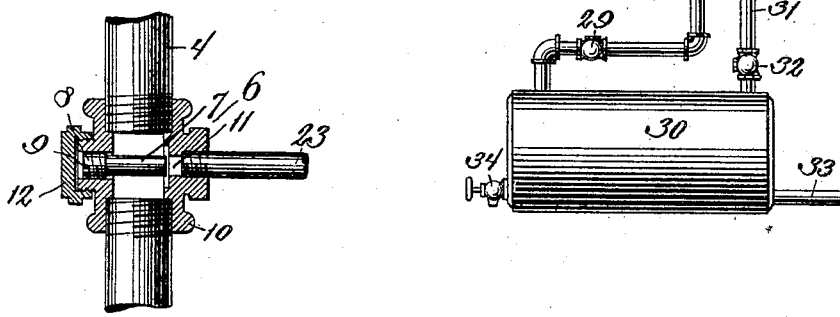

Figure 1 shows a system embodying my invention and containing two radiators. Fig. 2 shows a system in which a second thermostat is used to control the connecting-pipe. Fig. 3 is a sectional view showing the thermostat in the discharge-pipe. Fig. 4 shows another modification of my improvement. Fig. 5 is a sectional view of the discharge-valve shown in Fig. 4.

Similar numbers denote similar parts in the different figures.

Referring to Fig. 1, 1 is a radiator of any suitable form. 2 is a supply-pipe provided with suitable supply-valves 3 3. 4 is the discharge-pipe. 5 is the discharge-valve. This valve is made of any ordinary construction. 6 is a thermostatic valve placed in the discharge-pipe beyond the discharge-valve. The form of this thermostatic valve is shown in section in Fig. 3. It consists of the expanding member 7, extending across the discharge-pipe 4. This expanding member is provided with a head or support 8, adapted to screw into an opening 9 in one side of the discharge-pipe or in one side of a fitting 10 provided for this purpose. The other end of the expanding member is adapted to expand into a recess or opening 11, and thereby to close that opening. 12 is a cap covering the opening through which the expanding member is inserted in the fitting 10. By removing the cap 12 and turning the head 8 in one direction or the other the position of the expanding member 7 can be properly adjusted. 13 is a diaphragm-motor mounted in any suitable casing or support 14 and connected, by means of the arm 15, with the lever 16, which is fulcrumed at 17 and connected at its outer end by means of the rod 18 with the discharge-valve 5. 19 is a screw adapted to screw into a support 20 and carrying at its lower end any suitable form of loop inclosing the lever 16, so that by turning the screw 19 up or down the valve 5 can be opened or closed positively by hand. When the screw 19 is in its middle position, the lever 16 is left free to be moved by the diaphragm 13. 21 is a fluid-pressure chamber underneath the diaphragm 13, provided with a suitable vent 22 and connected, by means of the pipe 23, with the fitting 10, in which the thermostat 7 is placed. The pipe 23 connects with the recess or opening 11, so that when the expanding member 7 is expanded and closes the opening 11 the pipe 23 is shut off from the discharge-pipe. 24 is any ordinary hand-valve for shutting off the pipe 23. 25 is an air branch extending from the radiator to the discharge-pipe, as shown, and provided with any suitable automatic air-valve 26. 27 is an exhauster connected with the discharge-pipe. 28 is an ordinary valve to cut off the exhauster. 29 is a check-valve. 30 is a tank or reservoir for the water of condensation. 31 is a relief-pipe provided with any suitable form of valve 32. 33 is a pipe through which the water of condensation can be pumped to the boiler or any other suitable place. 34 is a cock for drawing off the water of condensation.

The operation of this form of my invention is as follows: When the system is started, the contents of the discharge-pipe 4 being cold the thermostatic valves 6 are open. The valve 24 being open, the exhauster 27 reduces the pressure in the fluid-pressure chambers 21 and causes the diaphragms 13 to move down, thereby opening the discharge-valves 5. The exhauster draws out the air and the water of condensation from the radiators until the temperature in the discharge-pipe at the thermostatic valves 6 is raised sufficiently to expand the expanding member 7 and shut off the connection between the pipes 23 and the discharge-pipe. The pressures on the two sides of the diaphragm 13 then become equalized, and the discharge-valves 5 are closed. As soon as the thermostats 6 are cooled again the discharge-valves are opened, as already explained, and this operation is repeated. The water of condensation flows down into the tank 30, and the air is removed through the exhauster 27. Thus the water of condensation and the air are positively and thoroughly removed from the system. By closing the valve 24 the discharge-valves 5 can be closed, if desired. The discharge-valves can also be closed or opened manually by means of the screws 19.

In Fig. 2 the parts are the same as already described except that the connecting-pipe 23 is provided with a solenoid-valve 35, which is operated by means of a thermostat 36, adapted to be hung upon the wall or in any other suitable place. The thermostat 36 is connected with the valve 35 by any suitable means—such, for example, as an electric circuit.

The operation of this form of my invention is the same as that already explained except that when the temperature of the room rises to the predetermined or desired point the thermostat 36 operates to close the valve 35, and thereby to close the discharge-valve 5. When the temperature of the room or other place falls below this point, the valve 35 is opened, and after this the system operates in the manner already explained.

In Fig. 4 the parts are the same as already described, except that in place of the diaphragm to control the discharge-valve I use a discharge-valve 37, similar in construction to the valve described and claimed in my pending application, filed May 15, 1900, Serial No. 16,809. This valve is shown in section in Fig. 5. It consists of a casing 38, provided with a port 39, a valve 40 to close the said port, a piston-motor 41, operating the valve and made of such a size as to produce an equalizing-passage 42 between this piston and the wall of the casing. 43 is a fluid-pressure chamber above the piston, with which the pipe 23 is connected at one end. 44 is a coiled spring pressing down on the top of the piston.

This system operates in the manner already explained. When the pipe 23 is closed, the pressures on the two sides of the piston are equalized through the equalizing-passage 42, and the valve 37 is closed.

Some of the advantages of my invention are as follows: The air and water of condensation are positively removed through the discharge-pipe, and this removal is controlled by the temperature in the discharge-pipe beyond the discharge-valve. So long as the water of condensation is cold or so long as air is passing through the pipe the discharge-valve remains open, but when the water of condensation passing through the pipe beyond the discharge-valve is above the temperature for which the thermostatic valve in the discharge-pipe is set the discharge-valve is closed. Should the heating vehicle escape into the discharge-pipe, the discharge-valve will be closed at once, thus preventing the loss of any substantial quantity of the heating vehicle. The discharge of air and water is further controlled by the temperature of the apartment which is being heated.

What I claim as new, and desire to secure by Letters Patent, is—

1. The combination with a radiator of a supply-pipe, a discharge-pipe, a valve in the discharge-pipe, a motor controlling said valve, the said valve device being provided with a fluid-pressure chamber on one side of said motor, and with a vent for said chamber, a fluid-pressure device, a pipe connecting the fluid-pressure device and the chamber and a thermostat adapted to be operated by the temperature in the discharge-pipe and to control the pipe connecting the fluid-pressure device with the chamber, substantially as set forth.

2. The combination with a radiator of a supply-pipe, a discharge-pipe, a valve in the discharge-pipe, a motor controlling said valve the said valve device being provided with a fluid-pressure chamber on one side of said motor, and with a vent for said chamber, a fluid-pressure device, a pipe connecting the fluid-pressure device and the chamber and a thermostat adapted to be operated by the temperature in the discharge-pipe and to control the pipe connecting the fluid-pressure device with the chamber, and a second thermostat adapted to be placed in the space to be heated and to control the said connecting-pipe, substantially as set forth.

3. The combination with a radiator of a supply-pipe, a discharge-pipe, a valve in the discharge-pipe, a motor controlling said valve, the said valve device being provided with a fluid-pressure chamber on one side of said motor, and with a vent for said chamber, a pipe connecting the fluid-pressure chamber with the discharge-pipe, a thermostat adapted to be operated by the temperature in the discharge-pipe and to control the pipe connecting the fluid-pressure chamber with the discharge-pipe, and an exhauster connected with the discharge-pipe, substantially as set forth.

4. The combination with a radiator of a supply-pipe, a discharge-pipe, a valve in the discharge-pipe, a motor controlling said valve, the said valve device being provided with a fluid-pressure chamber on one side of said motor, and with a vent for said chamber, a pipe connecting the fluid-pressure chamber and the discharge-pipe, a thermostat adapted to be operated by the temperature in the discharge-pipe and to control the pipe connecting the fluid-pressure chamber with the discharge-pipe, a second thermostat adapted to be placed in the space to be heated and to control the said connecting-pipe, and an exhauster connected with the discharge-pipe, substantially as set forth.

5. The combination with a radiator of the supply-pipe, a discharge-pipe, a valve in the discharge-pipe, a motor controlling said valve, the said valve device being provided with a fluid-pressure chamber on one side of said motor, and with a vent for said chamber, a pipe connecting the fluid-pressure chamber with the discharge-pipe, and the thermostat 6 placed in the discharge-pipe and provided with the expanding member 7 adapted to expand into the recesses 11 and thereby to close the pipe connecting the fluid-pressure chamber with the discharge-pipe, and an exhauster connected with the discharge-pipe, substantially as set forth.

6. The combination with a radiator, of a supply-pipe, a discharge-pipe, a valve in the discharge-pipe, a motor controlling said valve, the said valve device being provided with a fluid-pressure chamber on one side of said motor, and with a vent for said chamber, a pipe connecting the fluid-pressure chamber with the discharge-pipe, a thermostat adapted to control the pipe connecting the fluid-pressure chamber with the discharge-pipe, and an exhauster connected with the discharge-pipe, substantially as set forth.

In testimony whereof I have signed my name to this specification in the presence of two subscribing witnesses.

ANDREW G. PAUL.

Witnesses:
  THOMAS K. PETERS,
  NANNIE FINLEY.